July 4, 1961   J. E. HAWKINS ET AL   2,990,904
METHOD AND APPARATUS FOR CONTINUOUS GEOPHYSICAL EXPLORATION
Filed June 18, 1956   2 Sheets-Sheet 1
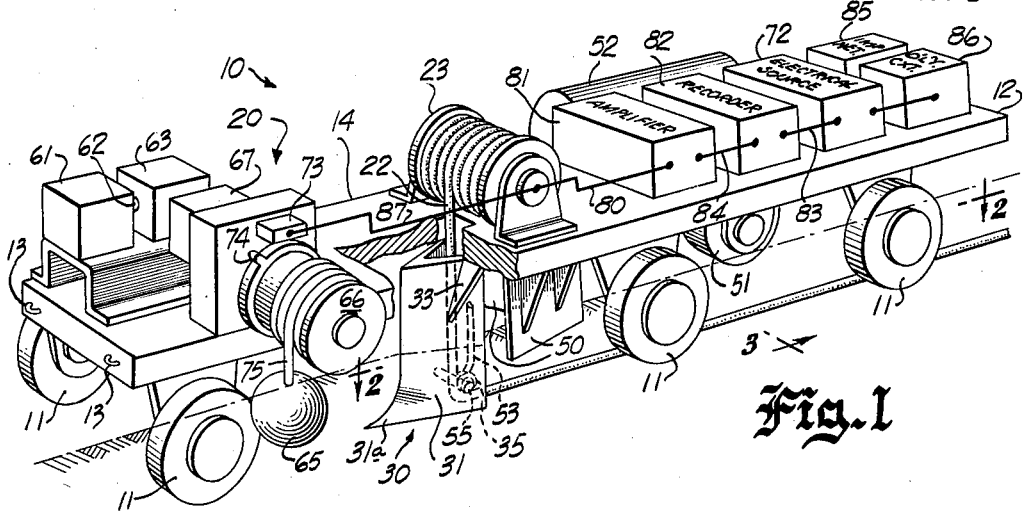
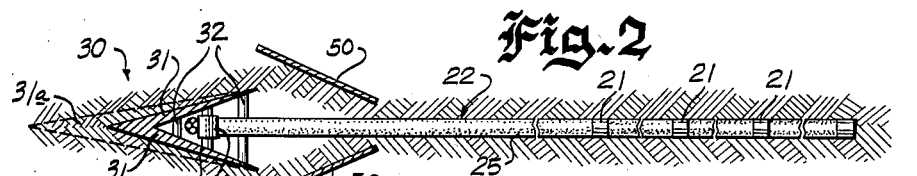
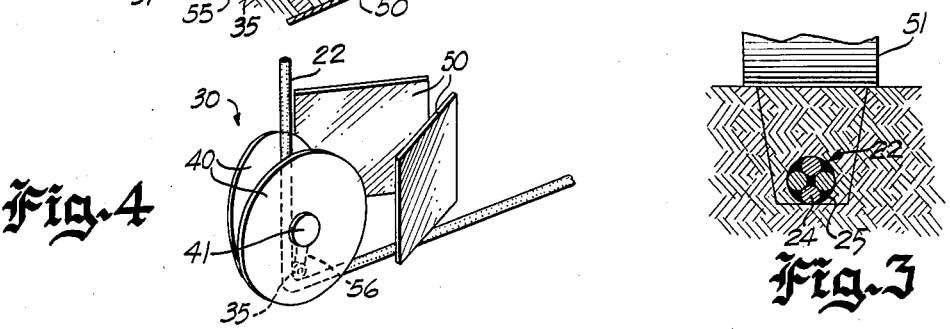
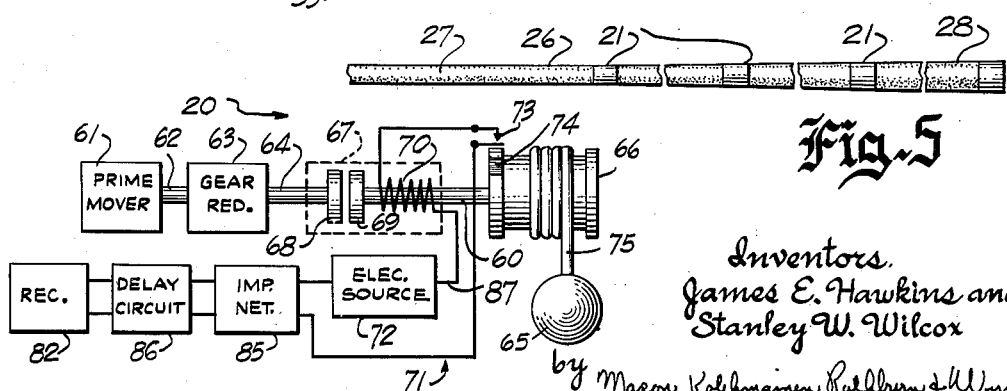
Inventors.
James E. Hawkins and
Stanley W. Wilcox
by Mason, Kolehmainen, Rathburn & Wyss
Attorneys.

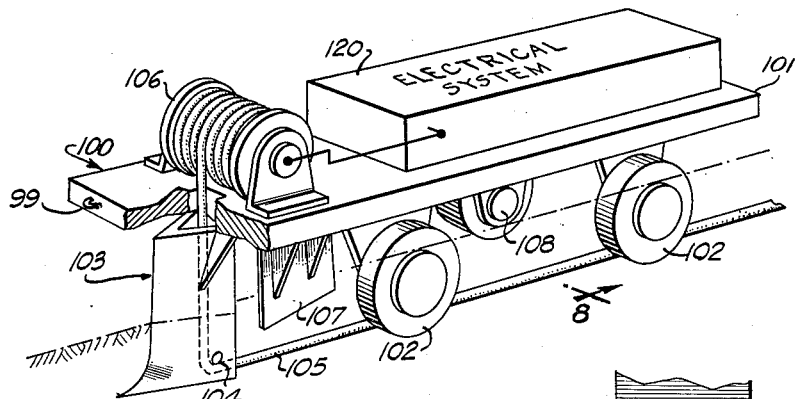
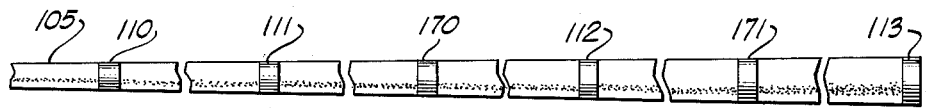
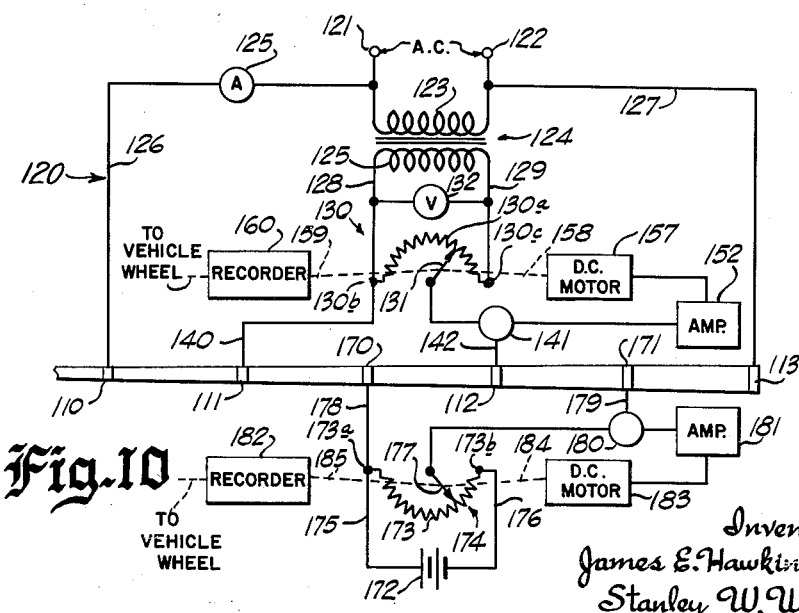

United States Patent Office 2,990,904
Patented July 4, 1961

2,990,904
METHOD AND APPARATUS FOR CONTINUOUS GEOPHYSICAL EXPLORATION
James E. Hawkins, Broken Arrow, and Stanley W. Wilcox, Tulsa, Okla., assignors to Seismograph Service Corporation, Tulsa, Okla., a corporation of Delaware
Filed June 18, 1956, Ser. No. 591,863
14 Claims. (Cl. 181—.5)

This invention relates to a method and apparatus for exploration and, more particularly, to an improved method and apparatus for determining and recording the characteristics, nature, and disposition of the geological structure of formations adjacent to the surface of the earth.

In particular, this invention relates to a system of geophysical exploration in which energy is generated on the earth's surface for transmission through the formations immediately adjacent the earth's surface to a receiving location where it is detected and recorded. The present invention is particularly well suited for use in the highway construction field where there has long existed a genuine need for a rapid and reliable method of determining and evaluating the impact and loading resistance of highway subgrades, particularly in formations located within the upper ten feet or less of the earth's crust. Information of this type is useful not only in determining the type of highway to be constructed, but also in ascertaining the necessity for and type of fill material to be used in regions of the highway where the natural subgrade is inadequate to support the proposed highway. Frequently, where subgrade soils having unsatisfactory load-bearing properties are encountered, many thousands of tons of fill material must be transported to the proposed highway site and substituted for the inadequate subgrade soils. The durability and wearability of highway surfacing materials are often functions of the type of natural subgrade as well as the fill material employed. In this connection it will be recognized that the type of subgrade and the type and amount of fill material required are major factors influencing construction costs and should be known well in advance in order to facilitate planning and financing of the highway project. Furthermore, it is important to determine the characteristics of the highway subgrades prior to actual construction, due to the fact that failures flowing from an inadequate or defective subgrade foundation usually become evident only after the highway has been completed. Preferably, the nature of the subgrades should be determined during survey of a proposed highway site before a great deal of time and money has been spent.

It would be desirable, therefore, to determine the existence and location of unsatisfactory subgrade formations during the preliminary planning stage of highway construction, so that more detailed and exhaustive explorations may be initiated by employing conventional measuring equipment available on the market. The latter equipment is unsuitable for preliminary survey work due to its high cost and, even more important, to the time and labor required to make the necessary measurements.

In view of the foregoing discussion, it is apparent that it would be advantageous to provide a geophysical exploration apparatus employing a vehicle carrying a signal generating device and a plurality of spaced apart detectors, which vehicle may be guided along the proposed highway site to obtain a horizontal log of the characteristics of adjacent subsurface formations.

Accordingly, it is an object of the present invention to provide an apparatus embodying the desirable characteristics described hereinabove for effecting continuous geophysical exploration of the subsurface formations located immediately adjacent the earth's air-to-ground interface.

It is likewise an object of the invention to provide a new and improved apparatus for effecting measurements of the velocity of propagation and elastic properties of earth formations located immediately below the earth's air-to-ground interface.

Another object of the present invention is to provide an apparatus for continuous geophysical exploration of subsurface formations wherein means are utilized for burying at a predetermined depth a cable containing a plurality of sampling means responsive to generated energy in order to obtain measurements indicative of the characteristics of the subsurface formations.

A still further object of the present invention is to provide a new and improved apparatus of the character described above wherein a cable containing a plurality of devices responsive to generated energy is buried at a predetermined depth beneath the earth's surface while at the same time maintaining engagement between the energy responsive devices and the subsurface formations while the cable is moved through the formations.

A further object of the present invention is to provide an improved apparatus for measuring continuously the geophysical properties of formations adjacent to the earth's surface wherein a vehicle is provided with means for burying at a predetermined depth a cable containing a plurality of seismometers or detectors responsive to elastic waves periodically generated at fixed distance from the detectors together with means for moving said cable and the source of said waves in unison and at a predetermined velocity in order to obtain periodic measurements indicative of the characteristics of the earth's subsurface formations.

Still a further object of the present invention is to provide an improved electrical resistivity measuring system for continuously measuring the geophysical properties of formations adjacent to the earth's surface.

Still a further object of the present invention is to provide an improved electrical resistivity determining system for continuously measuring geophysical properties of formations adjacent to the earth's surface including a cable adapted to be embedded within the formations and embodying a plurality of spaced apart electrodes, some of which are utilized in the generation of an electrical field within the formations and others of which are utilized in detecting potential differences resulting from the field and representing resistivity of the formations between the detecting electrodes.

It is also an important object of the present invention to provide a new and improved method for obtaining measurements of the velocity of propagation and elastic properties of earth formations located immediately below the earth's air-to-ground interface.

Another object of the present invention is to provide a new and improved method of obtaining a horizontal log indicating the characteristics of formations located immediately adjacent the earth's surface.

Other objects and advantages of the present invention will become apparent from the following description of illustrative embodiments thereof, in accordance with which reference is had to the accompanying drawing in which:

FIG. 1 is a perspective view showing apparatus comprising a sonic exploration system characterized by the features of and suitable for the practice of the method of the present invention, depicted with a portion of the circuits illustrated schematically;

FIG. 2 is an enlarged sectional view taken along a line substantially corresponding to the line 2—2 of FIG. 1;

FIG. 3 is a further enlarged sectional view looking in the direction of the arrow 3 in FIG. 1;

FIG. 4 is a fragmentary and perspective view showing another embodiment of the plow which may be employed in the apparatus of FIG. 1;

FIG. 5 is an elevational view illustrating another embodiment of the cable which may be employed in the apparatus of FIG. 1, shown with portions of the cable broken away;

FIG. 6 is a partially schematic, partially diagrammatic view of a periodic elastic wave generator and associated equipment employed in the apparatus of FIG. 1;

FIG. 7 is a perspective view showing apparatus comprising an electrical resistivity measuring system characterized by the features of and suitable for the practice of the method of the present invention shown with a portion of the circuits illustrated schematically;

FIG. 8 is an enlarged sectional view looking in the direction of the arrow 8 in FIG. 7;

FIG. 9 is an enlarged elevational view of a cable used with the apparatus of FIG. 7; and FIG. 10 is a partially schematic, partially diagrammatic view of an electrical resistivity mapping system and associated equipment employed in the apparatus of FIG. 7.

In accordance with the present invention, the foregoing and other objects are realized by employing an apparatus for measuring continuously the geophysical properties of formations adjacent the surface of the earth and, among other characteristics, the elastic and load-bearing properties of the formations in order to analyze highway subgrades for highway construction.

More specifically, in the practice of the present invention the above result may be accomplished by either a sonic system or an electrical system, both of which embody signal generating means for developing energy within the formations to be tested and spaced-apart energy responsive means carried by a cable adapted to be embedded in and moved through the formations. To assure adequate sensitivity of the embedded energy responsive means, additional means are employed for bringing them into intimate contact with the formations being logged. The energy obtained at the spaced-apart energy responsive means provides information which indicates the variations in the characteristics of the geophysical formations encountered and, hence, is useful in providing parameters from which the nature of the different formations adjacent to the earth's surface may be determined.

Referring now to the drawings, there is illustrated in FIGS. 1 through 6 an embodiment of the present invention employing a sonic system and in FIGS. 7 through 10 another embodiment of the present invention employing an electrical system, both of which function to explore the geophysical properties of formations adjacent to the earth's surface and to provide a continuous horizontal lag. Considering first the sonic system shown in FIGS. 1 through 6, without attaching any significance to the order of description, and referring more particularly to FIG. 1, there is illustrated a trailer 14 having a substantially flat body 12 suitably supported from the ground or the surface by a plurality of wheels 11. Eyelet rings 13 on the body 12 accommodate one end of a towing cable (not shown) the other end of which may be secured to any type of power driven tractor or towing device (not shown).

In order to generate seismic or elastic wave vibrations by which the geophysical properties of the formations adjacent the earth's surface may be analyzed, there is provided an earth vibrating mechanism or an elastic wave generator 20 which may be mounted upon the front end of the trailer 14 or, alternatively, may be carried upon the tractor towing the trailer. Accordingly, the terms "vehicle means" or "vehicle" as used in the following specification and the annexed claims may refer to a single vehicle or to a train of interconnected cars moving in unison. The reference numeral 10 has been assignel to the trailer 14 and its associated tractor which, as indicated above, are referred to simply as a vehicle. The elastic wave generator 20, to be described in greater detail hereinafter, functions to generate elastic wave vibrations at spaced intervals and these vibrations are transmitted through the subsurface formations immediately adjacent the air-to-ground interface.

As is best shown in FIG. 2 of the drawings, a plurality of seismometers 21, which may be referred to as energy sampling means or detecting means, are disposed at spaced intervals along a cable 22 and are employed to detect the elastic waves and to convert the mechanical vibrations to electrical signals. The cable is conveniently wound upon a windlass or winch 23, appropriately fastened to the body of the trailer 14. It will be appreciated that when the subsurface formations are not being logged, the entire cable 22, including the seismometers 21, may be wound about and stored upon the windlass 23 to facilitate unencumbered movement of the vehicle 10. In operation, the windlass 23 is rotated to pay out the cable until the seismometers 21 are located at sufficient distance behind the vehicle 10 to obtain reliable signals representative of the characteristics of the adjacent subsurface formation. In this connection, it should be observed that the spacing between the seismometers and the rear end of the vehicle may be varied to obtain the best results in the particular locality under survey. For continuous geophysical exploration, once the cable has been payed out a predetermined distance, the windlass 23 is locked against rotation so that movement of the vehicle will result in towing the cable 22. For intermittent geophysical exploration, the cable may be alternately payed out and wound up as desired.

In accordance wih an important feature of the present invention there is provided a slow means 30 for continuously trenching the surface of the earth to a predetermined depth and for disposing the cable 22 within the trench as the vehicle is moved. More particularly, the plow means 30, in one embodiment thereof, as shown in FIGS. 1 and 2, comprises a blade plow which includes a pair of fixed cutters 31 inclined relatively to one another and joined together along their leading edge to define a somewhat V-shaped trenching tool having its apex near the extreme forward end of the trailer 14. The cutters 31 are maintained in inclined relation by a plurality of spreaders 32 and are supported from the vehicle by a plurality of spaced rods 33. The apex of the fixed cutting tool is preferably sharp and pointed in order to define a cutting surface. The lowermost portions of the blades are flared outwardly and are pointed in a forward direction, as indicated at 31a, and, when in use, are embedded within the earth to form a trench cutter in which displaced soil flows upwardly along the flared portion and is deposited on opposite sides of and along the edge of the trench.

A second embodiment of the plow means, which may be used in place of the fixed cutters 31, is shown in FIG. 4 wherein there is illustrated a roller plow comprising a pair of rotatable disc cutters 40 inclined relatively to one another in such a manner as to define a trenching tool. The cutters 40 are mounted upon a spacer support 41 and are rotated by engagement with the ground as the vehicle 10 is moved. As the cutters are rotated their bottom edges penetrate the earth's surface to form a shallow trench and the displaced soil is forced outwardly where it is again deposited along the trench edges.

Regardless of whether the blade or roller plow means are employed, it is desirable that the cable be snugly seated on the bottom of the trench in order to assure satisfactory operation of the seismometers. To this end, a seating pulley 35 is rotatably mounted, in the embodiment illustrated in FIGS. 1 and 2, on a horizontal bar 55, which is suitably secured to the plow cutters 31, and in the embodiment illustrated in FIG. 4, on a bifurcated support 56 suitably secured to the spacer support 41. The seating pulley 35 operates to bias or press the cable against the base of the trench when the cable is either being dragged or payed out by the winch, as described above.

It will be appreciated that in lieu of the above described embodiment of the plow means, a power driven trenching device may be substituted therefor in which the subsurface formation would be actually removed and the formations returned to the trench in two separate operations. This power driven trenching apparatus would be similar to the conventional ditch digging equipment used for digging pipe line ditches and would be of particular value in hard subsurface formations where considerable depth penetration is desired. Irrespective of the type of plow means employed, it will be recognized, in view of the foregoing description, that the soil resulting from the formation of the trench accumulates along the trench edges. To direct the accumulated soil back into the trench after the cable has been laid a pair of scraper blades 50 are suspended from the body 12 of the vehicle and are disposed in converging relationship from front to rear, thereby forming a scoop. The blades 50 at their most rearwardly disposed portions are spaced apart a distance slightly in excess of the width of the trench so that the scooped up soils will be mounded over the cable laid in the trench. In order to press or pack the redeposited soil firmly against the cable, a heavy roller 51 is rotatably supported upon the trailer 14 in longitudinal alignment with the plow means 30. The roller 51 is rotated by engagement with the ground as the vehicle is moved, thus packing the redeposited soil into engagement with the cable in order to increase the sensitivity of the seismometers 21. To increase further the sensitivity of the seismometers, a water spray system, including a water tank 52 suitably secured to the vehicle 10, may be employed, whereby a fine spray of water may be trained on the soil immediately surrounding the cable by means of a water tank conduit 53 and associated control valves (not shown).

Turning now to a description of the cable 22 per se, and referring particularly to FIG. 2, there is illustrated a conventional seismic cable containing any desired number of conductors 24 encased within an outer protective sheath 25. Each of the conductors is electrically connected to one of the seismometers 21 likewise housed within the cable 25. The seismometers 21 are spaced apart at suitable fixed distances from one another, these distances preferably, but not necessarily, being equal. It will be understood that when the cable is payed out by operation of the winch 23, the plurality of seismometers will be buried beneath the surface of the earth at a predetermined depth and will be dragged behind the vehicle 10 at fixed distances relative to the vehicle 10 or, more specifically, to the elastic wave generator 20 carried on the front end of the vehicle. The dragging of the cable beneath the surface of the earth tends to create a tunnel in which the contact between the seismometers and the formations immediately adjacent to the cable is somewhat decreased, with a resulting reduction in the sensitivity of the seismometers.

In order to overcome this difficulty in the event that the loss of seismometer sensitivity becomes acute, a cable 26 of the type shown in FIG. 5 may be employed. The cable 26, like the cable 22 previously described, contains a plurality of seismometers 21, together with an equal number of conductors protected by an outer sheath 27. However, instead of having a constant outer diameter, the cable 26 is provided, along the portion adjacent the end thereof carrying the seismometers, with an outwardly tapered section indicated at 28. By this arrangement, the seismometers 21 are wedged against and remain in firm engagement with the formations immediately adjacent the cable when the cable is dragged behind the continuously moving vehicle 10.

Considering now more in detail the elastic wave generator 20, and referring to FIGS. 1 and 6, there is illustrated the generator and its associated timing and indicating mechanism. Power for the operation of the generator may be furnished by a prime mover 61 which has an output shaft 62 for driving a gear reduction device 63 provided with an output shaft 64. To impart to the surface of the earth periodic vibrations and thereby generate elastic waves, there is employed a simple weight 65 suspended from and suitably wound about a winch 66, which, in turn, is mounted upon the vehicle 10. A shaft 60 carrying the winch 66 is drivingly connected to the shaft 64 through a magnetic clutch 67 comprising plates 68 and 69, the plate 69 being adapted to move axially into engagement with plate 68 upon energization of clutch coil 70. With plates 68 and 69 engaged, a drive connection is, of course, established between shaft 64 and the winch driving shaft 60. For satisfactory performance, it is necessary that the weight 65 be raised under driven power, released for free fall, and then immediately raised again to prevent dragging of the weight 65. To achieve the described operation, there is provided an electrical control circuit 71 comprising an electrical energy source 72, such as a battery, the clutch coil 70 and a normally closed timing switch 73. The latter switch is mounted in fixed position upon vehicle 10 and is disposed in cooperative relationship with and actuated by a lug 74 mounted on an end of the rotatable winch 66. When engaged by the lug 74, the switch 73 is opened to disengage the plates 68 and 69 of the magnetic clutch, thereby permitting the weight to fall freely and initiate an elastic wave upon impact with the ground. A time delay is embodied in the switch 73 equal to the transit time of the weight 65 from its maximum raised position to its impact position in order to prevent reenergization of the magnetic clutch and elevating of the weight until after the weight has imparted a vibration pulse to the ground. As soon as the time delay has expired, the switch 73 closes to energize the magnetic clutch, thereby effecting rotation of the winch 66 with a consequent winding of the cable 75 thereon. The winch is drivingly connected to the power source until the lug 74 actuates the switch 73, at which time the above-described operation is repeated. In this manner, elastic waves or seismic vibrations are generated at spaced intervals as the vehicle 10 is moved along its course. In view of the foregoing description, it will be recognized that the weight is lifted to a height corresponding to the circumference of the winch 66 and is dropped from this height to generate the elastic waves, thus insuring the generation of pulses having substantially uniform intensity or amplitude.

By proper design of the control system described above, the winch 66 may be rendered operative to drop the weight once each second as the vehicle 10 moves forward at constant velocity. If the vehicle is driven at three miles per hour, an elastic wave or seismic vibration is generated once every 4.4 feet. Manifestly, if more frequent measurements of the subsurface formations were desired, the period between droppings could be decreased or, alternatively, a plurality of weights might be dropped in sequence instead of employing a single weight as illustrated and described above. It will be apparent that many other devices for generating elastic waves could be substituted for the generator 20 described above. Moreover, the shaft 62 may be sprocket driven from the rear wheels of the vehicle 10, thus dispensing with the prime mover 61. The latter arrangement would possess the additional advantage of correlating the dropping of the weight with the movement of the vehicle. To avoid slipping, the rear wheels may be provided with earth penetrating spikes or the like.

In order to produce a permanent record of the electrical signals developed by the seismometers 21, the electrical energy is transmitted to a multiple trace recorder 82 (powered by the electrical source 72) through the cable conductors 24, suitable windlass commutation means (not shown), multiple conductors 80, conventional amplifying equipment 81, and multiple conductors 84.

To provide a time break signal for application to the recorder 82, a reference pulse is obtained across an impedance network 85 whenever the switch 73 is actuated by the lug 74 in fixed-time relation with the generation of an elastic wave. The pulse developed across the network 85 prior to being applied to the recorder 82, as illustrated in FIG. 6, is fed into a delay circuit 86 to effect a time delay equal to the fixed transmit time of the free falling weight 65 occurring between actuation of the switch 73 and the generation of the elastic pulse. Multiple conductors 87 are employed to electrically energize the magnetic clutch 67 by the electrical source 72. In this manner a standard is provided for comparing the time lapse occurring between the generation of an elastic wave pulse and the detection of that pulse by the respective seismometer 21.

In operation, after the cable 22 containing the seismometers has been embedded beneath the surface of the earth at a predetermined depth by movement of the vehicle 10, the earth vibrating elastic wave generator 20 is operated to generate periodic seismic vibrations or elastic waves. The elastic waves are transmitted through the formations adjacent the earth's air-to-ground interface at a velocity and attentuation respectively dependent upon the velocity of propagation and elastic properties of said formations. The elastic waves are detected by the seismometers to develop signals for application to the recorder along with the reference pulse obtained from the elastic wave generator. The recorder produces a record, as, for example, a magnetic recording in reproducible form, containing a plurality of traces each representative of the signals received by one of the seismometers. Generally, the traces appear in side-by-side relationship on the record with the time break signal providing correlation of the time relationship existing between traces. The time relationship existing between the so-called "first break" of the signals arriving at each seismometer, that is, the signals passing directly from the elastic wave source to the seismometers without reflection from buried subsurface horizons, is, of course, a function of the velocity of propagation of the formations. Since each formation is characterized by a different velocity of propagation, a meansurement of the difference in arrival time of the waves at the different seismometers provides one parameter indicating the nature of the subsurface formation. Such a measurement may, of course, be made when the records produced by recorder 82 are reproduced by suitable playback apparatus (not shown). Moreover, since the generated pulses are of uniform strength, the amplitudes of the signals detected by the seismometers are attenuated by different amounts depending upon the elastic properties of the particular formation being logged. Thus, a comparison of the relative amplitudes of the signals reproduced from the records provides a second parameter useful in analyzing the subsurface formations. By determining the velocity of propagation and the elastic properties, the type of subsurface formations can be identified and the load-bearing qualities of these formations can be ascertained. As indicated above, a determination of the latter qualities provides information useful in predicting the cost of preparing the subsoil or highway subgrade, or at least in determining the locality where more expensive and detailed soil testing should be undertaken.

In view of the foregoing description, it will be appreciated that the embodiment of the present invention shown in FIGS. 1 through 6 provides a method for continuously logging the characteristics of the formations adjacent to the surface of the earth by employing the steps of (a) continuously embedding a cable containing a plurality of spaced apart seismometers at a predetermined depth beneath the surface of the earth, (b) periodically generating elastic waves at a fixed distance from said seismometers, (c) moving both said cable and the source of the waves at predetermined velocity so that the seismometers detect the generated elastic waves, (d) converting the detected elastic wave vibrations into electrical signals suitable for amplification and (e) recording and subsequently reproducing the electrical signals in order to facilitate a determination of the elastic properties and load-bearing properties of the formations adjacent to the earth's surface.

Considering now the embodiment of the present invention employing an electrical system, illustrated in FIGS. 7 through 10, and referring particularly to FIG. 7, there is illustrated a trailer 100 having a substantially flat body 101 suitably supported above the ground by pairs of front and rear wheels 102. Again, it will be understood that the trailer 100 could be self-propelled if desired and, accordingly, the term vehicle means as used in the claims is intended to cover both the self-propelled vehicle or a train of interconnected cars or vehicles. The trailer 100 is similar to the trailer 14 previously described and is adapted to be hitched to a tractor or other towing vehicle by means of a cable passing through suitable eyelets 99. One principal difference between the trailers 14 and 100 is that the portion of the trailer ahead of the plow means 30 and the forward pair of wheels 11 has been removed. The trailer 100 carries plow means 103, which may be identical to either the blade plow 31 or the roller plow 40 of the plow means 30, but which is shown as a blade plow. As previously described, the plow means 103 serves to trench the formations and cooperates with a seating pulley 104 to seat a cable 105 on the bottom of the trench. The cable 105 is, of course, adapted to be stored and payed out by means of a winch 106 suitably supported on top of the body portion 101 of the trailer. Furthermore, like the trailer 14, the trailer 100 includes a pair of scraper blades 107 secured underneath the trailer and behind the plow means 103 for directing soil removed by the plow means 103 back into the trench together with a heavy roller 108 for packing the redeposited soil against the cable disposed in the trench. By this arrangement, which is generally similar to the cable burying arrangement employed in the sonic system, the cable 105 is disposed at a predetermined depth beneath the surface of the earth and is dragged or moved through the formations to be tested at a predetermined velocity as the trailer 100 is towed along its course. As shown in FIGS. 8 and 9, the cable 105 may be of the six-conductor type and is preferably tapered throughout a portion thereof to assure firm contact of the cable 105, and in particular the electrodes described hereinafter, with the earth formations during movement of the cable.

In operation the cable is payed out a desired distance until the electrodes which it carries are buried within the formations to be tested. The winch 106 is then locked against rotation and the cable is dragged through the formation, as the trailer 100 is moved along its course.

In order to obtain the desired resistivity measurements, the spaced-apart electrodes 110, 111, 112 and 113 carried by the cable 105 (as best shown in FIG. 9) are individually connected to a different one of the cable conductors. The electrical measuring system 120 is basically of the Warner-Gish-Rooney type well known in the electrical well logging art. To this end, the current electrodes 110 and 113 are respectively connected through cable conductors 126 and 127 to the opposed output terminals 121 and 122 of a constant current A.C. source (not shown) in order to develop an electric field in the formations immediately surrounding the cable 105 between the electrodes. On the other hand, the potential or probe electrodes 111 and 112 are employed to detect or sample the difference of potential existing in the formations as a result of the A.C. field, which potential difference is a function of the electrical resistivity of the formations disposed between the electrodes 111 and 112. Thus, by continuously maintaining an electric field between the current electrodes 110 and 113 as the cable 105 is moved through the formations to be tested, the difference of potential existing between the potential electrodes 111 and 112 varies in accordance with the electrical resistivity of the formations disposed therebetween.

Considering the electrical measuring circuits in more detail, it will be observed by reference to FIG. 10 that the terminals 121 and 122 of the alternating current source are electrically connected to deliver current to the primary winding 123 of a transformer 124. As indicated above, one side of the A.C. source is also connected through an ammeter 125 and through the conductor 126 to the current electrode 110, while the other side of the A.C. source is connected via a conductor 127 to the current electrode 113. Thus, an electrical potential is impressed across the current electrodes which causes a current flow through the formations to create an electrical field. Returning to the transformer 124, its secondary winding 125 is electrically connected via conductors 128 and 129 across a voltmeter 132 and across terminals 130b and 130c of the resistance winding 130a of a potentiometer 130. The potentiometer 130 includes a wiper arm 131 movable along the winding 130a to pick off variable portions of the secondary voltage of the transformer 124. The terminal 230b of the winding 130a is connected directly to the potential electrode 111 through conductor 140 while the potential electrode 112 is electrically connected through a conductor 142 and through a conventional null-detecting device 141 to the wiper arm 131. The voltage appearing between wiper arm 131 and terminal 130b is in opposition to the potential difference existing between the electrodes 111 and 112 as a result of the predetermined orientation and connection of the transformer windings 123 and 125. In order to maintain a balance between these voltages to facilitate the resistivity measurements, the wiper arm 131 is adapted to be moved across the resistance winding 130a under the influence of a servo system controlled by error signals from the null detector 141 and consisting of an amplifier 152 and a D.C. motor 157 operatively connected to the wiper arm 131 through a mechanical connection represented by the broken line 158 in FIG. 10. It will be appreciated that as long as the voltage detected between the potential electrodes 111 and 112 remains constant and equal to the voltage appearing between wiper arm 131 and terminal 130b a balance of voltages will be effected and no current is supplied to the amplifier 152 from the null detector 141. Considering now the null-detecting device 141 in greater detail, it may comprise any well-known null detector which is adapted to produce a polarized output signal in response to unbalanced signals applied to its input terminals, i.e., signals of different amplitude from the potential electrodes 111 and 112 and from the potentiometer 130. Thus, when the voltage across the potentiometer winding 130a and the wiper arm 131 exceeds the voltage through the formations between the potential electrodes 111 and 112, the current flow to the amplifier 152 is so polarized that the D.C. motor 157 turns in a direction to move the wiper arm 131 toward terminal 130b until the voltages applied to the null detector 141 are again equal. Conversely, when the potential difference in the formations between the potential electrodes 111 and 112 exceeds the voltage between terminal 130b and wiper arm 131, the polarity of the output of the null detector 141 is reversed and the D.C. motor turns in an opposite direction to move the wiper arm 131 toward terminal 130c until the two signal input voltages to the null detector are balanced. The unbalance between the voltages applied to the null detector 141 as the cable is moved through the formations to be tested is attributable to changes in the properties of the formations adjacent to the cable 105.

As described above, the unbalances are eliminated by operation of the servo system in adjusting the position of the wiper arm, with the result that different states of equilibrium are reached in accordance with the changes in the electrical resistivity of the formations being tested. The position of the wiper arm 131 or, more specifically, the voltage appearing between the wiper arm and the terminal 130b is thus continuously representative of the sensitivity of the formations between the potential electrodes 111 and 112.

In order to obtain a permanent record of the variations of the electrical resistivity of these formations, the stylus or recording instrument of a suitable recorder 160 is mechanically connected, as indicated by broken line 159, to the wiper arm 131 of the potentiometer 130, with the result that variations of the position of the wiper arm 131 are recorded on a suitable recording medium. In order to correlate the resistivity measurements with the movement of the vehicle or trailer 100, the recording medium of the recorder 160 may be mechanically driven through suitable gearing (not shown) from one of the wheels 102 of the vehicle 100, so that, in spite of the acceleration or deceleration of the vehicle 100, the measurements always reflect the resistivity of the particular portions of the formations being tested.

In order to provide another parameter useful in determining the load-bearing and elastic properties of the formations adjacent to the surface of the earth, means may be provided for measuring the self-potential of the formations. To this end, two additional spaced apart electrodes 170 and 171 are carried on the cable 105 at positions spaced equidistantly from the electrodes 111 and 112, respectively, so that the same length of cable exists between the self-potential electrodes 170 and 171 and the potential electrodes 111 and 112. The circuit employed for measuring the self-potential of the formation to be tested utilizes a D.C. source or battery 172 which is electrically connected by conductors 175 and 176 across the terminals 173a and 173b of the resistance winding 173 of a potentiometer 174. The terminal 173a is electrically connected to the electrode 170 via a conductor 178 while the wiper arm 177 of the potentiometer is electrically connected to the electrode 171 through a null-detecting device 180 and through conductor 179. Thus, the null-detecting device 180 is supplied with a first D.C. signal existing between terminal 173a and wiper arm 177 and a second D.C. signal resulting from the self-potential signals appearing between electrodes 170 and 171. The null-detecting device 180 functions similarly to the null detector 141 previously described and develops a polarized output signal in response to an unbalance between the amplitudes of the two D.C. input signals. The potentiometer wiper arm 177, of course, is adapted to be moved along the resistance winding 173 in order to vary the voltage appearing between the terminal 173a and the wiper arm 177. Again, the movement of the wiper arm is controlled by a servo system in order to maintain a balance of the input signals to the null detector. To this end, the servo control system comprises an amplifier 181 and a D.C. motor 183 mechanically connected to the wiper arm 177 as indicated by broken line 184. In response to an unbalance between its input voltages, the null-detecting device develops a polarized output signal having a polarity which is a function of the direction of the unbalance. Thus, if the self-potential signals appearing between electrodes 170 and 171 exceeds the D.C. signal appearing between wiper arm 177 and terminal 173a, the polarity of the signal from the null-detecting device is such that the D.C. motor is rotated to move the wiper arm 177 towards terminal 173b. When, on the other hand, the self-potential signal is less than the voltage from the potentiometer, the polarity of the signal output from the null-detecting device is reversed and motor 183 is rotated in the opposite direction to move the wiper arm 177 toward terminal 173a. Thus, the servo system functions to maintain a continuous balance between the voltages applied to the null-detecting device with the result that the position of the wiper arm 177 or, more particularly, the voltage appearing between arm 177 and terminal 173a is continuously representative of the self-potential signals.

In order to record the variations of the position of the wiper arm 177 corresponding to the variations of the self-potential in the formations under test, the wiper arm is mechanically connected, as indicated by broken line 185, to the stylus or recording instrument (not shown) of a suitable recorder 182. The recording medium of the recorder 182 may again be mechanically driven from one of the wheels 102 of the vehicle or trailer 100 in order to correlate the movement of the vehicle with the self-potential signals recorded.

It will be appreciated that the electrical system illustrated in FIGS. 7 to 10, inclusive, provides both an electrical resistivity measurement and self-potential measurement to facilitate identification and separation of particular segments of the formations tested. If desired, the A.C. and D.C. measuring circuits may be combined to the extent of utilizing only four electrodes (two current electrodes and two probe electrodes) instead of six while at the same time employing suitable D.C. and A.C. filters for separating the A.C. and D.C. signals picked up by the potential electrodes. Regardless of the circuit used, the information derived is useful in determining parameters for identifying the load-bearing and elastic properties of the subsurface formations located along a prescribed course.

In view of the foregoing description, it will be appreciated that the embodiment of the present invention shown in FIGS. 7 through 10 provides a method for continuously logging the characteristics of the formations adjacent to the surface of the earth by employing the steps of (a) continuously embedding a cable containing a plurality of spaced-apart electrodes at a predetermined depth below the surface of the earth, (b) continuously producing an electric field by current flow between a pair of the electrodes, (c) moving both said cable and the current source for the electric field at a predetermined velocity, (d) continuously measuring the potential difference existing between a pair of the electrodes as a result of the field and, if desired, simultaneously measuring the self-potential existing in the formations and (e) recording the measured signals.

While the details of the present invention have been described in connection with illustrative embodiments thereof, it should be understood that such details are not intended to limit the invention, since many modifications will be apparent to those skilled in the art, which, nevertheless, follow the true spirit and scope of the invention as set forth in the accompanying claims.

Having thus described the invention, what is claimed as new and desired to be secured by Letters Patent of the United States is:

1. An apparatus for obtaining a log of the formations immediately adjacent to the surface of the earth comprising movable vehicle means adapted to be guided along a desired course adjacent to the formations to be logged, signal generating means carried by said vehicle means for transmitting energy through said formations, a cable carried by and extending longitudinally of said vehicle means and including means for sampling said energy during movement of said vehicle means along said course, means mounted on said vehicle means for embedding said cable and the sampling means within the earth formations and means on said vehicle means for recording the variations in energy received by the sampling means as said cable is pulled through said formations by movement of said vehicle means.

2. An apparatus for exploring and logging the geophysical nature and character of the formations immediately adjacent to the surface of the earth comprising movable vehicle means adapted to be guided along a desired course adjacent to the formations to be logged, signal generating means carried by said vehicle means for transmitting energy through said formations as said vehicle means is guided along said course, a cable secured to said vehicle means and extending longitudinally thereof, a plurality of spaced apart energy sampling means carried in fixed position upon a portion of said cable for receiving said energy during movement of said vehicle means along said course, means mounted on said vehicle means for embedding said cable portion and the energy sampling means in the formations to be logged during movement of said vehicle means along said course, and means on said vehicle means for recording the variations in energy received by said energy sampling means as said cable is pulled through said formations by movement of said vehicle means, said cable including conductor means extending from the energy sampling means to the recording means.

3. The apparatus of claim 2 wherein said embedding means mounted on said vehicle means includes means for removing part of said formations to define a trench and means for seating said cable within said trench.

4. The apparatus of claim 2 wherein said cable is tapered throughout the portion thereof carrying said energy sampling means, thereby to assure good contact between the energy sampling means and the formations.

5. An apparatus for exploring the geophysical nature and character of the formations immediately adjacent to the surface of the earth comprising elastic wave generating means, a cable, at least one seismometer attached to said cable at fixed distance from said generating means for converting detected elastic waves to electrical impulses, a device for recording said electrical impulses, means within said cable for transmitting said electrical impulses from said seismometer to said recording device, means for continuously moving said cable through formations immediately adjacent to the earth surface while said seismometers are connected to transmit said electrical impulses to said recording device and including means for digging a trench of predetermined depth by removing a portion of said formations, means operatively associated with the last-mentioned means for seating said cable within said trench, and means operatively associated with the two last-mentioned means for filling up the trench with the removed surface formations.

6. The apparatus defined by claim 1 wherein the signal generating means includes spaced apart current electrodes carried by said cable and connected through the cable to a source of energy on the vehicle means for continuously creating an electrical field within the formations adjacent to said cable as said vehicle means moves along said course and wherein the sampling means includes spaced apart potential electrodes carried by said cable for measuring potential differences resulting from said electrical field.

7. The apparatus defined by claim 1 wherein the signal generating means includes a first pair of electrodes mounted on said cable and electrically connected through said cable to a source of energy on the vehicle means in order to generate an electric field within the formation adjacent to the cable as the vehicle means is moved along said course and wherein the sampling means comprises a second pair of electrodes mounted on said cable between the first pair of electrodes for sampling potential differences resulting from said electrical field.

8. Apparatus for logging formations immediately adjacent to the surface of the earth comprising vehicle means movable along a desired course adjacent the formations to be logged, signal generating means carried by said vehicle for transmitting energy through said formations, a cable carried by and extending longitudinally of said vehicle means and including a plurality of spaced apart energy sampling means responsive to the energy developed by said signal generating means, means mounted to said vehicle means for digging a trench of predetermined depth by removing a portion of said earth formations, means mounted to said vehicle means for seating said cable within said trench, means mounted to said vehicle means for refilling the trench with the removed earth formations so that said cable and said energy sampling means is pulled through the refilled trench as said vehicle means is guided along said course, and means on said vehicle means for recording the energy received by the sampling means.

9. The apparatus defined by claim 8 wherein the portion of said cable carrying said energy sampling means is tapered in order to assure good contact between the energy sampling means and the earth formation.

10. The apparatus defined by claim 6 additionally including means for measuring the self-potential of the earth formations as said vehicle means is moved along said predetermined course.

11. The method of continuously measuring the geophysical properties of formations adjacent the surface of the earth which comprises generating by means of an elastic wave source vibrations in said formations during spaced apart time intervals and at points spaced predetermined distances apart along the earth's surface, receiving the vibrations by detecting means disposed in the formations at fixed preselected distance from said source, and continuously and simultaneously moving said source and said detecting means in unison during the generation and reception of said vibrations while maintaining said fixed preselected distance.

12. The method of continuously measuring the geophysical properties of formations adjacent the surface of the earth which comprises generating by means of an elastic wave source sonic vibrations in said formations at spaced apart time intervals and at points spaced predetermined distances apart along said formations, receiving said sonic vibrations by detecting means disposed at fixed preselected distance from said source, converting said sonic vibrations to electrical signals, continuously and simultaneously moving in unison said source relative to said formations and said detecting means through said formations during the generation and reception of said sonic vibrations while maintaining said fixed preselected distance, and recording the electrical signals to obtain a log of the characteristics of said formations.

13. The method of continuously measuring the geophysical properties of formations adjacent the surface of the earth which comprises generating elastic waves in said formations by an elastic wave generator, continuously embedding elastic wave detecting means at fixed preselected distance from said generator and at predetermined depth beneath the surface of the earth, and continuously and simultaneously moving said generator and said detecting means relative to said formations during the generation and reception of said elastic waves while maintaining said fixed preselected distance.

14. The method of continuously exploring the geophysical nature and character of formations adjacent the surface of the earth which comprises moving a vehicle over said formations, embedding a plurality of seismometers continuously in said formations at a predetermined depth beneath the earth's surface, moving said seismometers through said formations at said predetermined depth at the velocity of said vehicle, moving a seismic vibration generator at said velocity while maintaining fixed distances between said generator and each of said seismometers, operating said generator periodically to generate elastic waves in the earth to be detected by said seismometers, and recording the electrical output of the seismometers to obtain a log of the geophysical characteristics of said formations.

References Cited in the file of this patent
UNITED STATES PATENTS

| | | |
|---|---|---|
| 882,649 | Noble | Mar. 24, 1908 |
| 2,192,404 | Jakosky | Mar. 5, 1940 |
| 2,253,975 | Guanella | Aug. 26, 1941 |
| 2,377,903 | Rieber | June 12, 1945 |
| 2,378,440 | Scott | June 19, 1945 |
| 2,412,363 | Silverman | Dec. 10, 1946 |
| 2,531,088 | Thompson | Nov. 21, 1950 |
| 2,738,488 | MacKnight | Mar. 13, 1956 |
| 2,769,966 | Rines | Nov. 6, 1956 |
| 2,780,301 | Jakosky | Feb. 5, 1957 |

OTHER REFERENCES

Publication: The San Diego Union "Navy Announces New Ocean Bottom Mining," pages 2 to 23, Apr. 12, 1953.

"World Oil" magazine "Weight-drop Technique," by Alan D. Waldie, April 1956, page 148.